United States Patent

[11] 3,542,453

| [72] | Inventor | Frederick W. Kantor<br>610 W. 114 St., New York, New York 10025 |
|---|---|---|
| [21] | Appl. No. | 678,104 |
| [22] | Filed | Oct. 25, 1967 |
| [45] | Patented | Nov. 24, 1970 |

[54] GRATING DEVICE COMPOSED OF ELONGATED LAYERS
13 Claims, 26 Drawing Figs.

[52] U.S. Cl. ..................................................... 350/162;
156/6; 264/1; 350/319
[51] Int. Cl. ......................................................... G02b 5/18
[50] Field of Search ........................................... 350/162,
211, 213, 197; 250/51.5, 53.1; 65/31; 204/130

[56] References Cited
UNITED STATES PATENTS

| 1,966,792 | 7/1934 | Frederick ..................... | 350/197UX |
| 2,153,363 | 4/1939 | Bruche ......................... | 350/162UX |
| 2,218,270 | 10/1940 | Snook ........................... | 350/211UX |
| 2,441,747 | 5/1948 | Beshgetoor ................... | 350/211UX |
| 2,679,474 | 5/1954 | Pajes ............................ | 350/162UX |
| 3,334,956 | 8/1967 | Staunton ...................... | 350/162 |

OTHER REFERENCES
Badger " Two Devices Facilitating Spectrometry In The Far Infrared" Journal of the Optical Society of America Vol. 15, No. 6, Dec. 1927, pp. 370— 373. 350— 162.

*Primary Examiner*—John K. Corbin
*Attorney*—Curtis, Morris & Safford

ABSTRACT: The grating device comprises a body composed of elongated layers which end at a terminal surface transverse to the layers. Portions of the ends of certain ones of the layers are removed so that elongated recesses are formed in the terminal surface. Alternatively, selected layers are made of a material of relatively high radiation scattering ability while others are made of materials of low scattering ability. The pattern of the recesses or the highly scattering layers forms the body into a diffraction grating, or a zone plate, a diffusion mask, or an optical slit. The layers are located with extreme precision with respect to one another. The fabrication method comprises forming a body by "layering"; that is, by building the body out of layers of materials deposited sequentially one upon the other. Then the body is cut transversely through the layers, thus producing a terminal surface having bands defined by the exposed terminal edges of the layers. In one embodiment, some layers are made of a substance which is eroded relatively rapidly by a certain etching fluid, whereas other layers are made of material which is eroded very slowly by the same fluid. Then, the entire terminal surface is subjected to the etching fluid. By this means, the surface is given a relief pattern defined by the exposed edges of the layers. Alternatively, the layers can be made of materials having different radiation scattering abilities so that no grooving of the terminal surface is required.

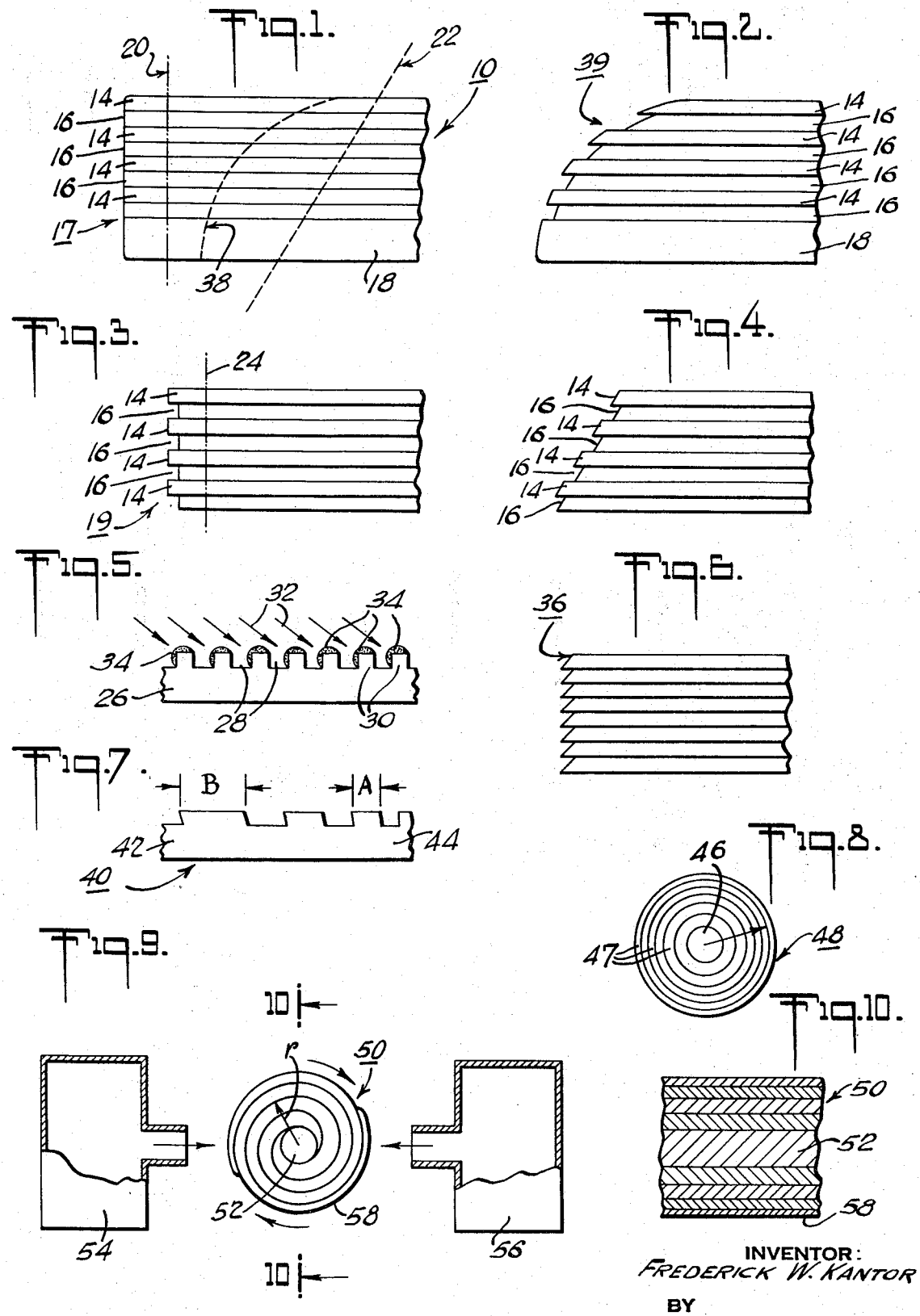

Patented Nov. 24, 1970

3,542,453

INVENTOR:
FREDERICK W. KANTOR
BY
Curtis, Morris & Safford
ATTORNEYS.

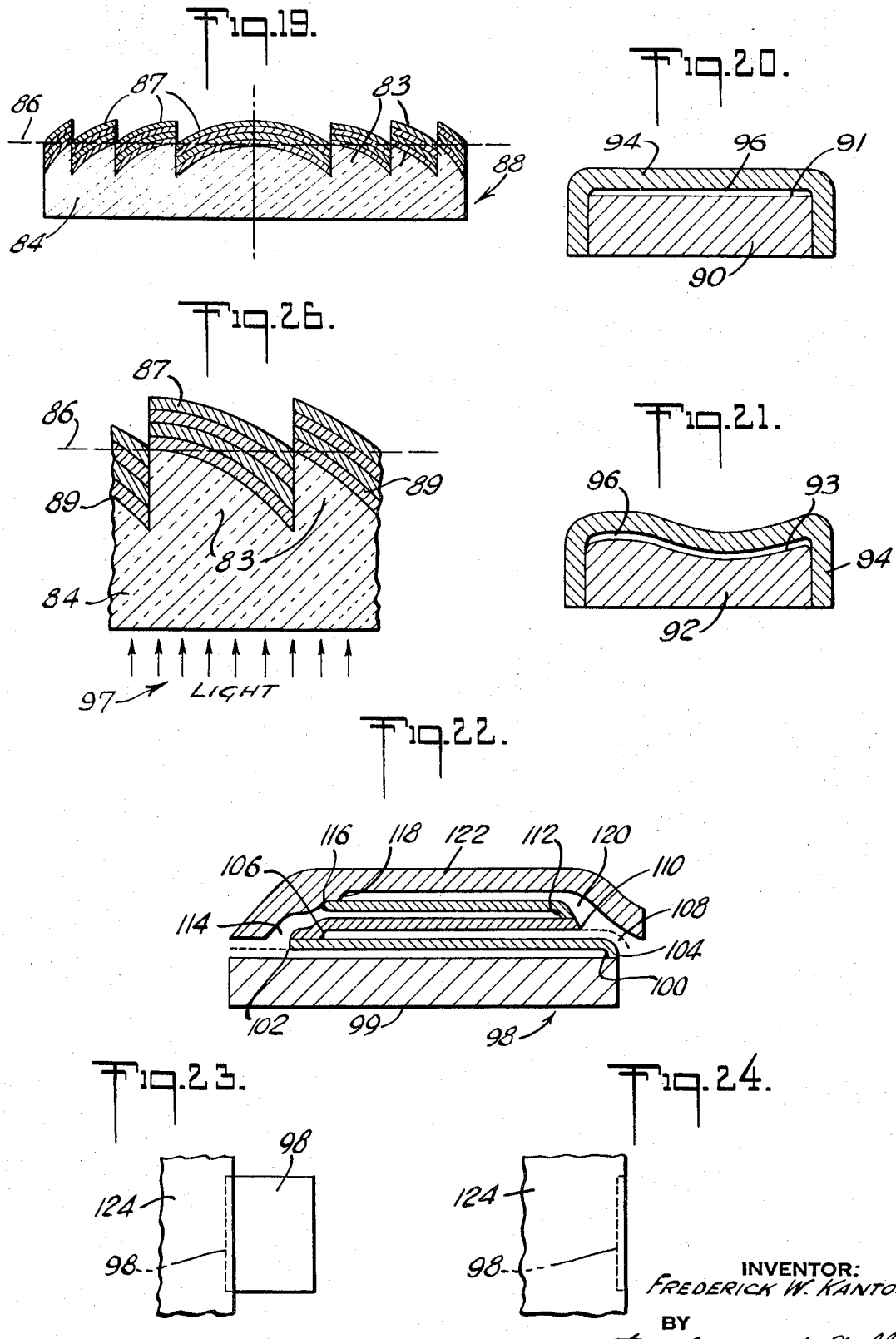

GRATING DEVICE COMPOSED OF ELONGATED LAYERS

The present invention relates to optical grating devices and methods of fabricating such devices.

As it is used herein, the term "optical grating device" means a device having relatively elongated grooves, openings or zones for affecting the transmission or reflection of radiation or moving particles. Examples of such grating devices include diffraction gratings, zone plates, diffusion masks and optical slits. The radiation includes X-rays, light, and other electromagnetic radiation.

It is a major object of the present invention to provide an optical grating device in which the elongated grooves, openings or zones have dimensions determined with a very high degree of accuracy, but without excessive manufacturing cost. It is another object of the present invention to provide a method of fabricating such devices with a high degree of accuracy and at a relatively modest cost.

The invention now will be explained by reference to the accompanying drawings. It is to be noted that the thicknesses of the various layers illustrated in the drawings generally are exaggerated for the sake of clarity.

In the drawings:

FIG. 1 is an enlarged elevation view of a layered body constructed in accordance with the present invention;

FIG. 2 is an elevation view of a grating device formed from the layered body shown in FIG. 1 after further treatment in accordance with the present invention;

FIG. 3 is an elevation view of an alternative grating device formed after further treatment of the layered body shown in FIG. 1;

FIG. 4 is another alternative grating device formed after further treatment of the layered body shown in FIG. 1;

FIG. 5 is an elevation, partially broken-away view of a shadowed replica of the surface of the device shown in FIG. 3;

FIGS. 6, 7 and 8 are, respectively, views of further embodiments of the grating device of the present invention;

FIG. 9 is a partially elevation and partially schematic view showing the construction of another embodiment of the grating device of the present invention, together with the process used in forming the grating device;

FIG. 10 is a cross-sectional view taken along line 10-10 of FIG. 9, illustrating another grating device constructed in accordance with the present invention;

Figure 25:
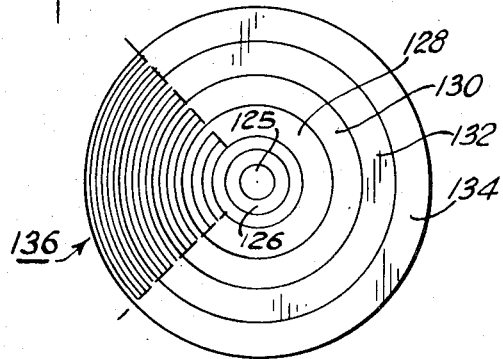

FIGS. 17 through 22 each depict an elevation view of a separate further embodiment of the grating device of the present invention;

FIGS. 23 and 24 are schematic diagrams illustrating process steps used in forming the structure shown in FIG. 22;

FIG. 25 is a plan view of another embodiment of the grating device of the present invention; and FIG. 26 is an enlarged view of a portion of the structure shown in FIG. 19 used to illustrate a further step in the process of the present invention.

GENERAL DESCRIPTION

Referring to FIG. 1 of the drawings, a layered body 10 is formed by depositing layers 14 and 16 one upon the other on a substrate 18. If the left edge or terminal surface 17 of the layered body is of the proper shape and smoothness, it can be used as a grating device either in the form shown in FIG. 1, or after further processing, as will be described in greater detail below. If the surface 17 is not suitable, the body 10 can be cut along a surface indicated by one of the lines 20, 22 or 38, or along any other desired set of contours transverse to the layers 14 and 16.

In making diffraction gratings and zone plates it is desired to produce a body having numerous spaced "opaque" bands separated by "transmissive" bands; that is, bands of materials which scatter radiation to a relatively high degree separated by bands of relatively low scattering ability. Where not specifically restricted, the scattering properties of materials are taken to include both ordinary scattering and absorption, as has become customary in modern physics. In accordance with the present invention, this can be accomplished simply by making the materials of alternate layers 14 or 16 in the layered body 10 of scattering materials and the other layers of transmissive materials, and then using the terminal surface 17 as a grating surface. Other terminal surfaces such as those formed by cuts indicated at 20 and 22 similarly can be used as grating surfaces. If the layered body on which the terminal surface appears is relatively thick, the resulting grating device is a scattering grating. If the body is relatively thin, the device is a transmission grating.

Further in accordance with the present invention, another way of producing the opaque and transmissive bands is by recessing the terminal ends of selected layers inwardly from the ends of the other layers on the terminal surface of the layered body, thus forming a surface with evenly spaced ridges. If desired, the recessed layers are made of transmissive material, and the other layers of opaque material. However, all layers can be made of materials having similar scattering abilities, and then the ridges are coated with an opaque material, such as by "slant-shadowing", in order to make the ridges opaque.

The recessing of the terminal ends of selected layers can be accomplished by removing them mechanically, but it is preferred to remove the ends by selective etching. In selective etching, the layers to be removed are made of materials subject to being eroded relatively rapidly by the particular etchant to be used, whereas the other layers are made of a substance subjected to being eroded relatively slowly by the etchant. Thus, the entire terminal surface of the layered body can be immersed in the etchant to perform the selective etching desired.

Replication may be used to reproduce at a relatively low cost the surfaces created by the above described techniques. Replication techniques are well known in the art and include carbon deposition, collodian film replicating, etc.

THE FORMATION OF LAYERED BODIES

One of the highly advantageous features of the present invention is that it uses the well developed technology for the preparation of thin films to control the thickness of the layers in the layered body with extremely high accuracy. For example, use of the vacuum evaporation process permits control of the thickness of the layers to an accuracy limited only by statistical fluctuations in the arrival of atoms at the surface being coated. For a layer about 1000 atoms thick, this amounts to only about 30 atomic diameters.

Other highly accurate layer formation techniques are known. For example, there are techniques in which a substance having a polar molecular structure is dispersed on a liquid so as to form an oriented monomolecular film. Examples of such substances include organic molecules with one water soluble end and one oil soluble end (certain stearates, etc.). Other examples of such substances may be found in the literature describing the use of the Langmiur trough. Layers can be formed by passing the object through the film, or by continuously feeding the film onto a rotating body. Other techniques, based on the dispersion of a dissolved film over a liquid surface, with subsequent loss of carrier solvent, are also well known. Electroplating and anodizing are suitably accurate techniques for producing layers for use in the present invention. Epitaxial growth and "sputtering" are well known film-forming techniques capable of forming layers with precise thickness control. Reactive formation and decomposition formation of deposits are well known. In these processes the material being deposited may not exist in its final state except at the surface upon which deposition is occurring. For example, tungsten iodide decomposes in a particular temperature range to deposite tungsten. As an example of reactive formation, some plastics may be deposited by reaction on the surface to be coated, and this reactive process may be controlled by an incident electron beam, or light flux, or other radiation, as is well known in the art. Any of these technologies for formation of films and deposits may be used within the scope of this invention, as may other methods which also are used for forming such coatings and deposits, such as simple dipping, spraying, "frit" coating (as is used in enameling), etc.

Different layers in the same body need not be deposited or formed by the same technique, and the number of possible permutations among the techniques described above is quite large. Some techniques are more appropriate for use with particular materials, or for use with particular ranges of layer thickness. Other techniques can be used to provide a high degree of perfection in the surface finish or to produce a particular physical structure in the layer. For example, dipping can be used to produce a layer with a smooth surface, despite small irregularities in the surface of the layer on which the dipped layer is formed. Machining, polishing, etching, and other steps may be interspersed among layering steps. Also, the materials of some of the layers may be chosen to selectively absorb dyes, and such dying steps may be included at various stages of forming and cutting the layered body.

The control of the lateral position, material, and thickness of the bands formed by the terminal ends of the layers on the terminal surface of the layered body can be used to control variations in the position and depth of the grooves therein. For example, as described above, a body may be constructed with some of its layers made of a material which can be selectively removed by a chemical process, or by evaporation, by electrochemical etching, or by other well-known removal techniques. Then, by controlled removal of that material, it is possible to place depressions in the surface. The terminal edges of the layers on the unetched terminal surface 17 may be built up selectively by selective deposition, such as by chemical substitution, electroplating (where one or more of the materials in the layers is chosen to be a compatible substrate for plating), selective crystal growth, etc, thus forming a layered body with ridges.

Alloying processes, for example those in which different metals are deposited simultaneously from more than one source to form an alloy layer, can be used to produce gradients in the relative concentration of the materials from top to bottom in the layer. Thus, the rate of removal of the material from that layer when subjected to a selective etchant will vary with the relative concentration of materials and will produce a depression whose bottom is shaped in accordance with the relative concentration.

The materials of which the layers are made should be selected so that they have the radiation-scattering and fabrication properties desired. Also, diffusion of materials of adjacent layers into one another should be minimized. This can be accomplished by selecting materials which do not diffuse into one another readily, or by the use of special processing, or by both methods. Iron and magnesium comprise one pair of materials which do not readily diffuse into one another; silicon oxide and aluminum form another such pair. The iron-magnesium pair is further useful because the two materials produce substantially different degrees of scattering of X-rays, particularly X-rays having a wavelength around 1Ld. The silicon oxide-aluminum pair is additionally useful because the two materials not only produce different degrees of scattering, but they also have very substantial differences in the rates at which they are eroded by certain etchants, as is well known in the semiconductor industry.

The layer-forming process can be controlled so as to minimize diffusion between layers. For example, a major cause of unwanted diffusion in thin films is that in many processes the films are heated to relatively high temperatures. Techniques can be used to minimize such heating and thus minimize diffusion.

DIFFRACTION GRATINGS

A nonfocusing diffraction grating should have a relatively large number of parallel equally spaced regions of transmissive material between equally spaced opaque regions. One specific way in which this can be accomplished in accordance with the present invention is by the successive evaporation of aluminum layers 16 and silicon monoxide layers 14 of equal thickness onto the flat substrate 18. The layered body 10 so produced then is sliced along the surface identified by the line 20 illustrated in FIG. 1. The resulting terminal surface 19 (FIG. 3), after appropriate polishing, then is subjected to a suitable chemical etching bath to remove a small amount of the aluminum from each layer 16 near the surface, thus producing grooves. The grooved surface can be used as shown in FIG. 3 as a diffraction grating, or, by the use of techniques described below in connection with FIGS. 23 and 24, it can be cut along a plane 24 to form a thin body suitable for use as a transmission grating. Gratings can be formed also be replicating the grooved surface; e.g., by the application of collodion, or the vapor deposition of a plastic material onto the surface 19. Then the replica is "slant-shadowed" with a relatively opaque material, in the manner described in detail below.

As another example, layers 14 of iron and layers 16 of magnesium of equal thickness are successively evaporated onto the substrate 18, and then the body 10 is cut along the plane 20. The resulting terminal surface then is polished and ready for use as a grating. If the resulting body is made thin, it can be used as a transmission grating.

For many uses of gratings, it is desirable to have a grooved surface which is tilted or "blazed" at a particular angle or set of angles, so as to direct radiation into a particular order of the grating's spectrum. This is ordinarily achieved by scratching a slanted groove into a plate of glass. In the present invention, however, the "blazed" grating can be produced as illustrated in FIGS. 1 and 4. The layered body 10 is cut along the angular line 22, and then alternate layers are etched on the cut surface, and the "blazed" structure shown in FIG. 4 is produced. In this way, a grating with very closely spaced blazed grooves may be produced accurately.

An alternative method of forming a "blazed" grating is to make each of the layers with a concentration gradient as described above. Then the layered body so formed is cut along the perpendicular line 20 instead of the slanted line 22, and the cut surface is etched. The resulting body 36 shown in FIG. 6 has slanted grooves on the etched surface which constitute a "blazed" grating.

"Shadowed" gratings, which are particularly suitable for use with short wavelength radiation, can be produced advantageously as illustrated in FIG. 5. First, a grating is produced by the layering techniques described above, and then a replica 26 (FIG. 5) is produced by a suitable replicating technique. The replica 26 has a relatively thin body with a set of precisely formed grooves 28 and ridges 30 on one surface. Then the ridges 30 are "shadowed"; that is, a heavy metal or other opaque material is evaporated and projected onto the ridges 30 at an angle as is indicated by the arrows 32. This builds up a coating 34 on one side and the top of each of the ridges 30, but not on the bottoms of the grooves.

A "line-focus" grating, that is, one which focuses incident radiation along a line, requires transmissive regions with spacings between them which vary in accordance with a known mathematical function. In accordance with the present invention, gratings with such a spacing can be produced by techniques identical to those described above for making nonfocusing gratings, except that the thickness of the layers of the layered body is varied in accordance with the mathematical function. Alternatively, the layered body 10 is given layers of equal thickness but is cut along a curved surface indicated by a line 38 (FIG. 1) instead of a flat surface. The resulting curved terminal surface 39 is selectively etched to produce the structure shown in FIG. 2. Next, a relatively thin, flexible replica 40 (FIG. 7) of the surface 39 is made, then is straightened out into a flat body as is shown in FIG. 7 and then is slant-shadowed. The distance B between adjacent grooves at the left end 42 of grating 40 is greater than the distance A near the right end 44 of the grating. The grooves in the right end 44 were produced by the lower portion of the curved surface 39. The spacing between grooves varies as a function of the slope of the curved surface 39.

The materials of which the layers 14 and 16 are formed can be selected for their relative abilities to reflect, scatter and transmit radiation. The gratings described above can be used for reflection or scattering. If the appropriate materials are used, and if the grating is made relatively thin, it can be used as a transmission grating.

Figure 17:
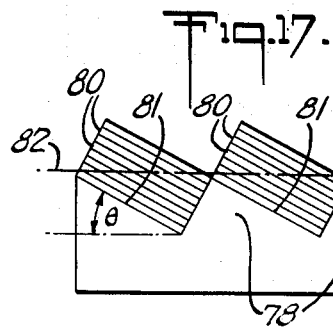

A particularly efficient method of forming a nonfocusing diffraction grating is illustrated in FIG. 17. Instead of forming layers one upon the other on a flat substrate, layers 80 are formed on a substrate 76 having an upper surface with ridges 78 which have a generally sawtooth cross-sectional shape. The layers are built up until each of the grooves is just filled. Then the layers are cut along the line 82 and the resulting surface is polished. The cut 82 is made so that it just touches the top edges of the ridges 78. The layers can be of differently etchable materials. The resulting structure has a number of parallel bands of zones of different materials which then are either used as a grating, or are selectively etched or otherwise treated as described above to form a grating. The number of zones formed is the product of the number of layers 80 and the number of sawtooth ridges 78 on the substrate. Thus, relatively large surface gratings having thousands of closely spaced grooves can be produced in only a fraction of the time which would be required if the grating were formed by the serial layer formation techniques described above.

Figure 18:
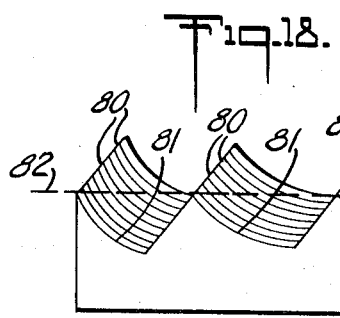

Line focusing gratings with graduated line spacings can be produced by the method illustrated in FIG. 18 in which the angle 0 (FIG. 17) of the tangent to the inclined upper surface 81 of each of the ridges 78 is varied within each ridge and between successive ridges. Each of the surfaces 81 is given a concave shape so as to produce the graduated line spacing desired. A line-focusing grating similarly can be produced with ridges having convex upper surfaces of varying slope, such as the ridges shown in FIG. 19 and described in greater detail below. Line-focusing transmission gratings produced in this manner are particularly useful in X-ray spectroscopy, and especially when X-rays of relatively low flux values are to be analyzed.

The ridge-bearing substrates 76 and 84 can be produced by the layering techniques described above. Each layer of a cylindrical or flat layered body can be given a concentration gradient and thickness suitable to produce ridges of the desired shape, and then the body can be selectively etched to produce the ridges. The first layer on the substrate can be a "tension-polished" layer as to be described below so as to smooth the etched surfaces of the substrate.

Other methods of forming diffraction gratings will be described below in connection with FIGS. 8 through 10.

ZONE PLATES

One way to produce a spot focus of radiation is by means of a circular zone plate. A zone plate usually consists of a plate with concentric circular bands of opaque material separated by concentric bands of transmissive material. The spacing between the bands varies in a manner similar to the variation of spacing in a line-focusing grating so that the zone plate focuses incident radiation at a spot. A second type of zone plate is produced if a spiral transmissive band of "zone" is used instead of a set of concentric circular zones. Such a zone plate produces a central spot which is dark, and the first bright fringe would be a few wavelengths away. However, when the circular zones are not perfect, and when the spiral pattern is not perfect, the two types of plates produce results which are essentially similar, with a general bright focal spot somewhat larger than that which would be produced by a set of perfect circular zones.

In accordance with the present invention, the first of the above-mentioned types of zone plates, that is, a zone plate with circular zones, can be produced by building up a layered body 48 (FIG. 8) having a set of cylindrical layers 47, which can be of differentially etchable materials, upon a cylindrical substrate 46. The thickness of the layers 47 varies approximately inversely with $r$, the radial distance from the center of the substrate 46. Then the layered body 48 is cut along a plane perpendicular to its axis of symmetry. The resulting terminal surface has circular bands which can be of differentially etchable materials. The terminal surface can be selectively etched or otherwise grooved to produce either a finished zone plate or a template to be replicated. For example, a zone plate usable as the lens for an X-ray microscope can be produced by replicating the template by means of a thin film, and then slant-shadowing the replica with a heavy metal. Many zone plates can be made from a single cylindrical body 48. The curved layers 47 may be formed by rotating the cylinder 46 and vacuum-evaporating materials onto it. Two or more ovens can be used to supply the different materials.

As in the case of diffraction gratings, selective etching may be avoided by making selected layers of opaque materials and others of transmissive materials.

If desired, an elliptically shaped zone plate can be produced by cutting the layered body 48 along a surface (not necessarily planar) which forms an angle to the axis of symmetry. The resulting zone plate can be chosen to produce a focus when the grating is used either for reflection or for scattering.

A zone plate with a spiral groove, or with a spiral-form reflecting or transmitting surface, can be produced from a spiral-form layered body 50 (FIG. 9). The layered body looks something like a jelly roll, with two or more layers of different materials wound in spiral form about a central cylinder or shaft 52. The layered body 50 may be formed, for example, by continuous vacuum deposition of two layers onto the cylinder 52 simultaneously from two ovens 54 and 56 while the cylinder 52 is rotated. The different ovens provide coatings of different materials with suitably chosen scattering or etching properties. Preferably, the density of molecules in each of the coating beams projected from each oven is held constant, the angular velocity of the shaft 52 is held constant, and the region of deposition of the beam of molecules onto the rotating shaft is restricted to be less than the full diameter of the rotating shaft is restricted to be less than the full diameter of the rotating shaft. This causes the thickness of successive layers to vary inversely with $r$, where $r$ is the radius of the body at which the layer in question is deposited, and automatically produces, in the completed zone plate, zones which are spaced correctly, to first order in the sine of the angle subtended at the focus by the zone having the largest diameter. Corrections in this spacing may be made by varying either the beam densities, the portion of the shaft exposed to the beam, or the angular velocity of the rotating shaft. With presently available technology, control of the angular velocity of the shaft is particularly simple and easy. Various known techniques such as those using feedback of layer thickness measurements can be used to control the deposition process to ensure obtaining layers of the desired thickness.

The zone plate is completed by cutting the body 50 transversely to its axis of symmetry, selectively etching the cut surface, replicating, etc., as described above. Etching may be avoided, if desired, by making the layers selectively opaque and transmissive, as described above.

Another method of forming a line-focusing diffraction grating is to cut either cylindrical layered body 48 or 50 along or parallel to its axis of symmetry. FIG. 10 shows a surface 58 which has been produced by cutting the layered body 50 along line 10–10. After selective etching, the surface 58 will have grooves with the spacing needed for a line-focusing grating. Of course, selective etching need not be used if the layers of the body 50 are made selectively transmissive and opaque.

Figure 11:
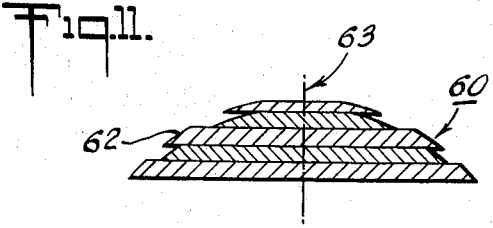
FIG. 11 is a cross-sectional view taken along line 11-11 of FIG. 12.
Figure 12:
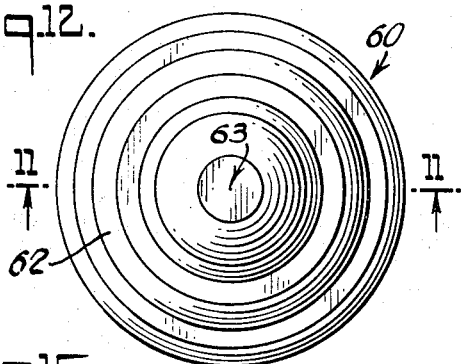
FIG. 12 is a plan view of another embodiment of the grating device of the present invention.

Another method of forming zone plates or other similarly contoured bodies is illustrated in FIGS. 11 and 12. First, a layered body 60 having planar selectively etchable layers of equal thickness is produced by means of the techniques described above. Then, the body is cut to form a three-dimensional curved surface 62 which is symmetrical about an axis 63 which is perpendicular to the layers of the body 60. The curvature of surface 62 is selected so that the bands formed on the surface will have the desired spacing. For a zone plate in which the zone spacing varies approximately inversely with $r$, as discussed above, the surface which gives the desired zone spacing is approximately a paraboloid of revolution. The surface 62 has such a curvature.

Next, the surface is selectively etched and replicated. The replica then is flattened out and thus forms a zone plate. The deformations associated with flattening can be taken into account in choosing the precise curvature of the surface 62. The replica can be flattened advantageously by using it as the wall in a gastight chamber and creating a pressure difference between the chamber and the ambient medium on the other side of the replica. The surface 62 can be concave or convex, and the replica can be deformed to whatever extent necessary to provide the ultimate desired zone spacing.

Figure 13:
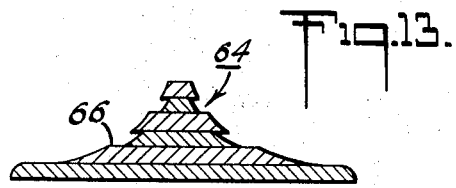
FIG. 13 is a cross-sectional view taken along line 13-13 of FIG. 14.
Figure 14:
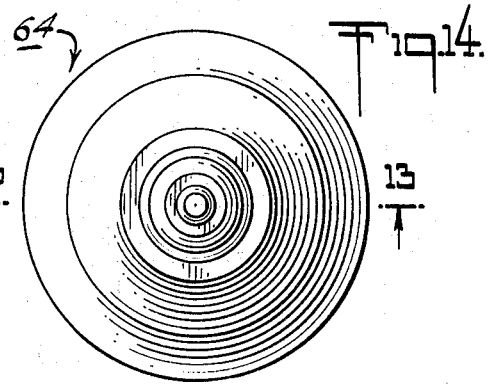
FIG. 14 is a plan view of another embodiment of a grating device of the present invention.

A surface having concentric zones of a width increasing with the radius $r$ can be produced as shown in FIGS. 13 and 14 which show a layered body having layers of equal thickness but of differently etchable materials. The surface of the body has been formed into a symmetrical solid of revolution with a cusp-shaped outline as indicated at 66. The shaped surface 66 then is selectively etched and replicated, and the replica is flattened or otherwise deformed to provide the surface desired.

Figure 15:
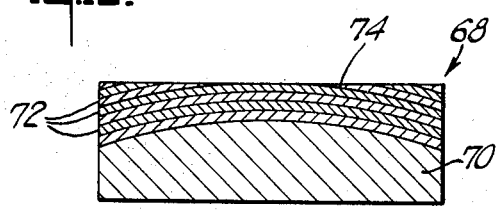
FIG. 15 is a cross-sectional view taken along line 15-15 of FIG. 16.
Figure 16:
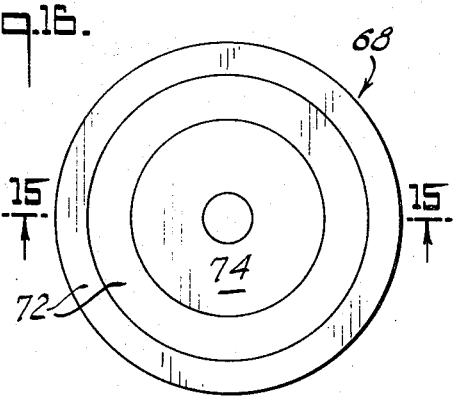
FIG. 16 is a plan view of another embodiment of the grating device of the present invention.

In accordance with the present invention, surfaces containing precisely defined curvilinear bands of materials can be formed by coating a curved substrate. The curvature of the substrate can be either two- or three-dimensional. This technique of surface formation is illustrated in FIGS. 15 and 16 which show a zone plate 68 made by use of this technique. A substrate 70 with a three-dimensionally curved spherical upper surface has a plurality of layers 72 of equal thickness on the surface. The layers are cut, lapped and polished to form a flat terminal surface 74 which exposes the edges of the layers 72 as a group of concentric bands. Preferably, the bands are composed of different materials such that the surface 74 can be selectively etched to form the finished zone plate 68. Etching is not necessary if a reflection or scattering zone plate is desired; instead, the layers can be made of materials with suitable scattering properties.

Zone plates having a relatively large number of zones can be produced from a structure such as that shown in FIGS. 15 and 16 having a relatively small number of layers 74 on the substrate 70. The method which gives this result is illustrated in FIG. 25. First, the layered body shown in FIG. 15 is cut along a plane tangent to the crown of the substrate 70, polished, and selectively etched. One or more replicas 125 (FIG. 25) of the central portion of the surface are made. Then, the body is lapped down to a new level, selectively etched, and annularly-shaped replicas 126 are formed. This procedure is repeated until further annular replicas 128, 130, 132 and 134 are produced. Each replica is dimensioned so as to fit about the next inner replica. The curvature of the substrate is determined by the ring spacing requirements in each replica. The result is a composite zone plate 136 with closely spaced zones.

The structure shown in FIG. 15 also can be taken to represent a cross-sectional view of a line-focusing diffraction grating. It is composed of a two-dimensionally curved substrate with layers 72 of uniform thickness. In this case, the top view of the structure would be substantially that shown in FIG. 10.

Any of the two- or three-dimensionally curved surfaces described may be replicated, slant-shadowed, or otherwise treated as described above.

The cuts which are made into the layers 72 need not form a flat surface. The cuts can have any two- or three-dimensional curved shape desired for making a particular zoned surface. The shape of the cut can be used to control zone spacing.

One advantage of the use of curvilinear substrates is that it may simplify the coating processes to be used, and may simplify the fabrication of the curved surfaces. There is advantage also in that the layers can be of uniform thickness. Thus, monomolecular layers 72 can be used and great precision in zone formation can be obtained.

In each case in which a curved or slanted substrate is used, the effects of the curvature or slant upon the layer forming process should be taken into account. For example, an atomic beam vacuum deposition process produces a layer on a surface whose thickness depends upon the angle which that surface makes with the direction of the incident beam. For example, the curved substrate in FIGS. 15 and 19 may not be precisely paraboloidal, because of this effect. Similarly, distortion of a compoundly curved replica when it is flattened should be taken into account in choosing the curved surface for the terminating cut. Both types of distortion may in some cases be used advantageously to control grating spacings.

Another method of forming zone plates is illustrated in FIG. 19 which shows a Fresnel-lens-shaped substrate 84 having multiple layers 87 on its ridge-bearing surface. A flat surface is cut along the line 86 at the peaks of the ridges 83 so as to produce a surface with concentric circular bands or zones formed by the layers 87. Graduated spacing between bands is provided by the varying convex curvature of the upper surfaces of the lens ridges. Concave curvature can be used to produce a similar effect. The graduated spacing so produced is approximately that required for a zone plate. These ridges can be chosen to have a curvature exactly suitable for the construction of a zone plate. The layers 87 preferably have different etching qualities. The cut surface then is selectively etched and treated to form the completed zone plate 88. It is to be noted that the foregoing procedure is quite similar to that illustrated in FIG. 18 for forming a line-focusing diffraction grating.

The zone plate 88 can have a relatively large number of zones with only a relatively small number of layers. For example, if a substrate having 1,000 ridges were coated with 1,000 layers, a zone plate with 1,000,000 zones would be produced. Lapping can be followed by etching, replication, slant-shadowing, etc., as above.

A method for accurately lapping the layered bodies shown in FIGS. 17 through 19 just down to the peaks of the ridges on the substrate is illustrated in FIG. 26, which shows an enlarged portion of the FIG. 19 structure as an example. The substrate 84 is made of a material which is transparent to radiation from a source indicated at 97. As an example, the radiation can be visible light and the material can be glass. The first layer 89 on the ridges 83 is opaque. While the layers 87 are being lapped, light or other radiation is directed through the bottom of the substrate 84. The lapping is stopped when the light or other radiation starts to pass through at the ridge peaks due to removal of the opaque layer 89. This technique also can be used to lap the surface 74 down to the crown of the substrate 70 in the structure shown in FIGS. 15 and 16.

BODIES WITH OPENINGS: MASKS AND SLITS

In the embodiments of the invention described above, the coated layers cover the entire surface of the substrate. However, the layers need not cover the entire surface, but may have any extend desired for a particular construction. The following description of the use of the present invention in the construction of precision masks and bodies with slits will illustrate this fact.

Precision masks are used, for example, in controlling the selective deposition of material to form a pattern on a surface, in the semiconductor industry and elsewhere. A mask 98 constructed in accordance with the present invention is illustrated in FIG. 22. The mask 98 has long, slender interdigitated openings through which a material can be deposited. The mask 98 can be used advantageously in making the electrode structure for cadmium sulfide photocells, for example. Metal is vapor-deposited through the interdigitated openings in the mask onto a film of cadmium sulfide to form the electrical conductor structure to which electrical leads are subsequently connected.

In accordance with the present invention, a substrate 99 is provided which is made of a first material which is relatively resistant to etching by a selected etchant. A layer of a second material which is relatively susceptible to etching by the same etchant ("etchable") is deposited on the upper surface on the substrate 99. However, the right edge of the substrate is uncoated. Coating of the right edge is prevented by means of masking or by other known means. Alternatively, a coating can be applied to the whole surface and the right edge of the coating can be removed by known means. The coating covers the rest of the upper surface of the substrate.

Next, a layer of etch-resistant material, which can be like that of the substrate, is applied over the entire first layer except for the portion to the left of the point 102. The right edge of the second layer also extends downwardly and covers the right edge of the substrate 99. Then a third layer, composed of etchable material, is applied to the second layer so as to cover all portions to the right of the point 106, including a portion extending down over the edge of the second layer in the region 108. Next, another layer of the etch-resistant material is applied over the third layer up to a point 110. Then, another layer of etchable material is applied so as to cover the entire structure formed so far except for the portion to the right of point 112. Next, another layer of etch-resistant material is applied over that structure to the point 116. Then still another layer of etchable material is applied from the point 118 and to the right over the entire surface of the structure formed so far, including the portion 120. Next, a relatively thick layer 122 of an etch resistant material is formed over the entire surface of the structure such as by dipping the layered body into the material of which substrate 99 is made. The layered body is cut and polished transversely to the substrate surface 99 and is selectively etched so that the etchable material is removed to a significant depth whereas the first material is relatively unaffected by the etchant.

The etched surface next is embedded in a body 124 (FIG. 23) of hardened plastic material which acts as a support. Then, as is shown in FIG. 24, the major portion of the layered body is cut away from the body 124 and the surface is lapped and polished down to a level such that only a thin slice of the layered body remains embedded in the block 124. The depth of lapping and polishing is such that all of the etchable material has been removed and only elongated interdigitated openings remain. Next, a mechanical support is attached to the thin layer while it is supported in the block 124. The support used should be shaped so that it does not block the openings of the mask. The body 124 next is removed by appropriate techniques, and the mask is complete. Numerous masks can be made by slicing a layered body into many thin wafers and attaching a support to each wafer.

The interdigitated openings in the mask have very precise dimensions because those dimensions are controlled by the thicknesses of the deposited layers, and the thicknesses of the layer can be controlled with great precision.

Plural masks with elongated openings can be superimposed one upon the other in order to provide more complex masking patterns with a precision heretofore unobtainable. For example, small dots of materials may be deposited at precisely determined locations through a grid formed by crossing two grating-form masks of the present invention.

Often it is desirable to use a body having a very narrow and precise slit in optical and other systems. Such slits can be produced easily with the layering method described above.

For optical use, an opaque substrate 90 (FIG. 20) having a flat surface 91 is provided if a straight slit is desired, and a substrate 92 (FIG. 21) with a curved upper surface 93 is provided if a curved slit is desired. The surface 91 or 93 is then coated with a thin layer 96 of transparent material. Finally, the coated substrate is embedded in a thick layer of opaque material, and a thin slice is cut from this body, along a plane perpendicular to the surface 91 or 92. The surface of the slice has the appearance shown in either FIG. 20 or FIG. 21. This thin slice contains a thin, transparent slit, whose width is equal to the thickness of the transparent coating 96 which was applied to the face of the opaque body. Alternatively, the layer 96 is composed of relatively etchable material while the materials of the substrate 90 or 92 and the coating 94 are composed of relatively unetchable material. The body is selectively etched to remove the layer 96 to a certain depth, and a wafer is cut off at a location which leaves an elongated opening where the layer 96 once was located.

PROCESS REFINEMENTS

Many deposition processes by means of which layers may be formed have the inconvenient property of propagating surface irregularities which gradually increase as successive layers are deposited. Electroplating is one example of a process with this problem. It is possible to reduce such contamination of layered surfaces to extremely low levels by using an evaporation process for deposition. However, even vacuum evaporation sometimes has the problem that solid particles ejected from simple evaporation boats sometimes reach the surface onto which material is being deposited. In accordance with the present invention, such imperfections can be corrected by occasionally applying, during the layering process, a layer which is formed by some process which smooths the imperfections. For example, the smoothing layer can be one which is formed by "tension polishing"; that is, one formed from a liquid whose viscosity slowly increases from a relatively low value to a relatively high value so that surface tension and viscous damping coact to produce a surface which is, on a microscopic scale, extremely smooth. The tension-polishing process is described in greater detail in my copending U.S. Pat. application Ser. No. 613,858 filed Feb. 3, 1967. One example of a tension-polished surface is a fire-polished glass surface which is applied by dipping. Another example is a cured epoxy surface, formed by dipping into uncured epoxy resin. The surface of the tension-polished layer can be much smoother than the surface which supports it, so that such layers serve the desirable purpose of stopping the propagation of imperfections into successive layers. A grating device of the present invention may have a relatively large number of layers. For a variety of embodiments of the invention it is advantageous to provide, at relatively infrequent intervals, several tension-polished layers. It may be in some cases that the tension-polished layer must be thicker than the other layers. If so, its thickness can be an integral multiple of the thickness of the other layers. The presence of a few such thick layers among the many thin layers need not do any significant harm to the accuracy of the grating device.

A liquid-in-liquid casting process can be used to produce layers which are not particularly affected by gravitational forces, and which, for this reason, usually can be made thicker than ordinary dipped layers. The layer being cast is supported by and in fluid equilibrium with a suitable liquid of roughly equal specific gravity. Then the viscosity of the layer being cast is increased from a relatively low to a relatively high value. For example, a layer of catalyzed but as yet uncured epoxy on a substrate could be supported in a fluid of about equal specific gravity while being slowly cured to form a tension-polished layer. This process is particularly interesting for use in applications in which great precision in the composite body is required, such as in forming bodies from which zone plates are to be made; and for use in applications in which it is desirable to produce layers with a wide range of thicknesses.

In constructing a composite layered body from various materials, there is no particular reason to deposit successive layers by the same technique. Further, it is not necessary that the materials forming the layers be in their final form at the time that they become embedded in successive layers. For example, plastics can be used which require curing, and the curing can be done after the layering process is completed, or at some intermediate stage. Some layers can be frozen solid when formed or made of a heat decomposable material, and then other layers deposited on them. The frozen or decomposable layers then can be made to disappear due to change from solid to gaseous or liquid form when the body is heated to the temperature at which it is to be used, or at which it is to be processed further. In this way, cavities can be left within the bodies. Layers of plastic can be polymerized by radiation after layering, metals can be allowed to alloy by heating and diffusion, etc. Chemical diffusion and substitution can be used to modify the properties of selected materials after layering, such as in the chemical tempering of glass, the doping of semiconductors, the hardening of metals, etc. Ceramics can be fired, pigmented layers can be bleached, etc.

Grating devices constructed in accordance with the present invention can be very high resolution devices. Thus, the grating devices are very well suited for use with radiation of extremely short wavelength such as X-rays, and also for use with low-energy neutrons.

The grating devices of the present invention are used, in general, for modulating electromagnetic or particle radiation, by directing the radiation against the terminal surface of the layered body. Thus, in using diffraction gratings and zone plates, the radiation is directed against the terminal surface of the layered body, or against a replica of the terminal surface, and the reflected or transmitted radiation is collected or observed in ways well known in the art. In the case of optical slits and masks, the radiation is modulated by being constrained to passage through narrow openings, as described above.

Some processes and devices which are superficially similar to those disclosed herein are shown in U.S. Pats. 1,960,817; 2,266,349; and 3,265,480. However, none of such prior patents disclosed grating devices of any kind, nor does any such patent disclose the process of the invention which produces grating devices with extremely accurate spacings between grooves and very high resolution.

Layered bodies for use in Bragg crystal scattering X-ray spectrometers are known in the prior art. See: "An X-Ray Method of Determining Rates of Diffusion In The Solid State", DuMond and Youtz, 11 JOURNAL OF APPLIED PHYSICS, pp. 357—365 (May, 1940); "X-Ray Diffraction By Multilayered Thin-Film Structures and Their Diffusion", Dinklage, 38 JOURNAL OF APPLIED PHYSICS, pp. 3781-—3785 (Aug., 1967). In such prior devices, X-rays are directed through a stack of layers, and are scattered back through the stack of layers. Such an arrangement is not a grating device, and does not have the relatively high efficiency and resolution of the grating device of the present invention.

The present invention is particularly suitable for use in making diffraction systems for use with neutrons. Transmission gratings and zone plates constructed with open spaces for the transmissive parts are advantageous for use in focusing neutrons. Focusing grating devices of the present invention are particularly suitable for use in the construction of microscopes, especially microscopes for use in studying the structure of crystallizable and other organic molecules. It is possible, by means of the present invention, to produce focusing zone plates suitable for use in a very low energy neutron microscope. Such a microscope has the advantage that neutrons of suitable wavelength (e.g., 10 angstroms) have energies so low that they might do relatively little damage to the object or substance being observed. For example, the neutron energies can correspond to the mean kinetic energy of molecules in an object cooled to about 4 degrees Kelvin.

The above description of the invention is intended to be illustrative and not limiting. Various changes or modifications in the embodiments described may occur to those skilled in the art and these can be made without departing from the spirit or scope of the invention. Other uses can be made of the method and devices of the invention without departing from the spirit or scope of the invention. For example, it is well known that gratings can be used as polarizers, and the gratings of the present invention can be so used.

I claim:

1. An optical grating device comprising a body having a surface with a plurality of serrations, a plurality of parallel built-up layers on said serrations and terminating at a terminal surface extending in a direction generally transverse to the direction of said layers, the terminal edges of selected ones of said layers being recessed from said terminal surface, the recesses formed by said recessed layers forming said grating device.

2. A device as in claim 1 in which said terminal surface is substantially flat and extends in a plane parallel to the plane joining the pinnacles of said serrations, said selected layers being alternate layers.

3. A device as in claim 1 in which the angle of inclination of each serration is the same.

4. A device as in claim 1 in which said upper surface of each of said serrations is curved, the curvatures of said serrations having a mathematical relationship to one another such that the spacing between terminal edges of adjacent layers is graduated and said device focuses incident radiation.

5. A device as in claim 4 comprising a zone plate, with said serrations being symmetrical with respect to the central axis of said zone plate.

6. A device as in claim 5 in which said serrations form a body having the shape of a Fresnel lens.

7. An optical diffraction grating device comprising, in combination, a solid body composed of a plurality of generally elongated, substantially parallel undistorted deposited built-up layers terminating at a curvilinear terminal surface extending in a direction generally transverse to the direction of said layers, alternate ones of the terminal edges of said layers which occur at predetermined intervals being recessed from said surface, the spacing between edges of alternate layers varying with the angle between the layer and the terminal surface.

8. An optical grating device comprising a body having a surface which is a replica of the terminal surface described in claim 7.

9. A device as in claim 7 in which said terminal surface is a surface of revolution about an axis perpendicular to said layers.

10. A device as in claim 9 in which said terminal surface is approximately hemispherical.

11. A device as in claim 9 in which said terminal surface is cusp-shaped.

12. A diffraction grating comprising a body having a plurality of parallel built-up layers terminating at a terminal surface extending in a direction generally transverse to the direction of said layers, a portion of the edge of each of said layers being recessed from said terminal surface, each of said layers being composed of at least two materials having different etching rates with a selected etchant, the relative concentration of said materials being graduated from one portion to the next of each layer.

13. An optical diffraction grating device comprising, in combination, a solid body composed of a plurality of substantially parallel substantially compoundly curved undistorted deposited built-up layers terminating at a substantially flat terminal surface extending in a direction generally transverse to the direction of said layers, at least one selected portion of the terminal edge of each of a plurality of alternate ones of said layers being recessed from said surface.